United States Patent [19]

Blond et al.

[11] Patent Number: 5,180,980

[45] Date of Patent: Jan. 19, 1993

[54] METHOD AND APPARATUS FOR MAGNETICALLY MEASURING THE THICKNESS OF A HIGH RELATIVE PERMEABILITY LUBRICANT FILM BETWEEN TWO RELATIVELY MOVING SURFACES

[75] Inventors: Alejandro Blond, Madrid, Spain; Gerhard Poll, Houten; Vedran Tadic, Culemborg, both of Netherlands

[73] Assignee: SKF Industrial Trading & Development Co., Nieuwegein, Netherlands

[21] Appl. No.: 711,127

[22] Filed: Jun. 6, 1991

Related U.S. Application Data

[63] Continuation of Ser. No. 508,120, Apr. 11, 1990, abandoned.

[30] Foreign Application Priority Data

Apr. 14, 1989 [NL] Netherlands .................... 8900932

[51] Int. Cl.⁵ .................... G01B 7/10; G01R 33/12
[52] U.S. Cl. .................... 324/229; 324/231
[58] Field of Search .................... 324/207.16, 207.17, 324/207.19, 207.22, 207.25, 226, 229–231; 252/62.51; 384/448

[56] References Cited

U.S. PATENT DOCUMENTS

| 3,249,860 | 5/1966 | Huggins | 324/231 |
| 3,981,844 | 9/1976 | Romankiw | 252/62.51 X |
| 4,519,931 | 5/1985 | Soga et al. | 252/62.51 |
| 4,661,774 | 4/1987 | Montgomery | 324/231 |

FOREIGN PATENT DOCUMENTS 852230  10/1960  United Kingdom ................ 324/231

OTHER PUBLICATIONS

Poon, S. Y.; "An improved magnetic reluctance transducer for the measurement of thin lubricant film thickness", Journal of Physics E: Scientific Instruments, vol. 3, Jul. 1970 p. 507-510.

Areflev et al; "Method of measuring... between rolling cylinders", Russian Engineering Journal, vol. 55, No. 2, p. 76, 1975.

*Primary Examiner*—Gerard R. Strecker
*Attorney, Agent, or Firm*—Rosen, Dainow & Jacobs

[57] ABSTRACT

Method for measuring the thickness of a lubricant film between two surfaces which are in motion with regard to one another, characterized by the fact that a lubricant with high relative permeability is used, whereby the polar pieces of an electromagnetic sensor are brought into contact with the lubricant film to be measured in such manner that they are bridged by the lubricant film.

6 Claims, 1 Drawing Sheet

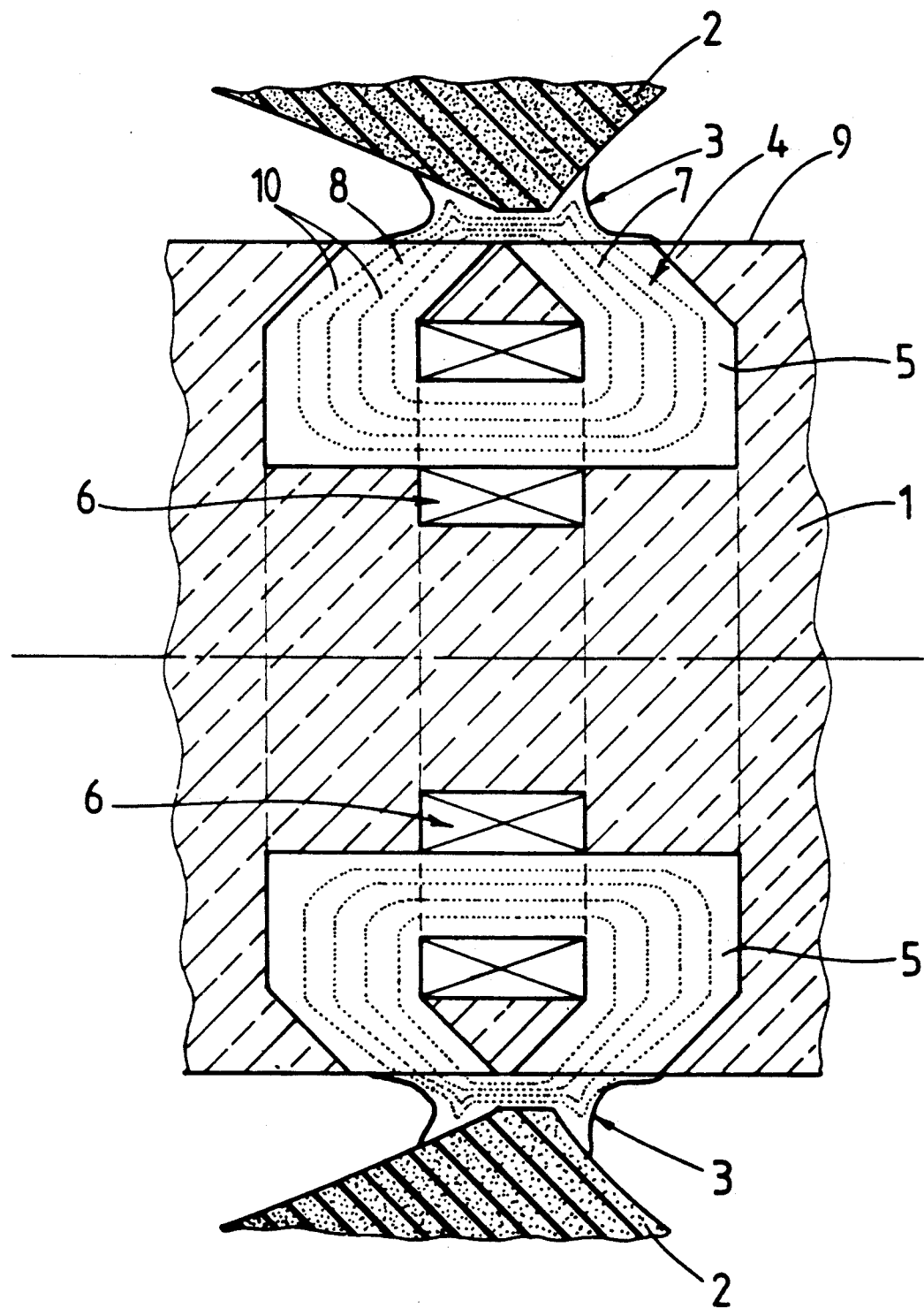

METHOD AND APPARATUS FOR MAGNETICALLY MEASURING THE THICKNESS OF A HIGH RELATIVE PERMEABILITY LUBRICANT FILM BETWEEN TWO RELATIVELY MOVING SURFACES

This application is a continuation of application Ser. No. 508,120, filed Apr. 11, 1990, now abandoned.

The invention concerns a method for measuring the thickness of a lubricant film between two surfaces which are in motion with regard to one another, as well as a device for applying this method.

Various embodiments of methods and devices of this type are known. Although the traditional methods and devices yield satisfactory measurements, they present the disadvantage that precise measurements are no longer possible with a thin lubricant film in the sub-micron area.

The invention aims in the first place at creating a method of the type referred to above, which does not present this disadvantage.

For this purpose the method according to the invention is characterized by the fact that a lubricant with high relative permeability is used whereby the polar pieces of an electromagnetic sensor are brought into contact with the lubricant film to be measured in such manner that they are bridged by the lubricant film.

Accordingly, this method takes advantage of the fact that the magnetic permeability of the lubricant film is different from that of air, so that the impedance of the electromagnetic sensor is determined by the thickness of the lubricant film. The impedance of the sensor may be determined by means of the usual circuits, e.g., by incorporating the coil of the sensor in a bridge circuit which is fed along one diagonal by an alternating current source, whereby an output signal can be captured on the other diagonal, which signal is dependent on the impedance of the sensor.

The invention provides also a device for the application of the method, which device according to the invention is characterized by an electromagnetic sensor mounted in the one surface at the site of the lubricant film to be measured, which sensor is equipped with a coil wound around a core whereby the core is executed with polar pieces ending in the plane of the one surface, which polar pieces are bridged by the lubricant film to be measured.

According to one embodiment of the invention the one surface may be the casing surface of a shaft whereby, according to the invention, the sensor is executed with an annular core with a more or less U-shaped cross-section, which annular core is contained in the shaft, whereby the outwardly directed extensions of the core are located with their free ends in the casing surface of the shaft.

A device executed in this manner can be used advantageously for measuring the thickness of the lubricant film underneath the sealing lip of a seal, e.g., a bearing seal.

BRIEF DESCRIPTION OF THE DRAWING

The invention is further explained with the aid of the drawing, which presents an embodiment of the invention in a highly schematic fashion.

DETAILED DESCRIPTION OF THE DRAWING

The drawing shows a shaft 1 in section, and the sealing lip 2 of a seal—not further shown—e.g., a bearing seal. A lubricant film 3 whose thickness has to be measured, extends between the sealing lip 2 and the shaft 1. The shaft 1 and the seal 2 consist of a material with low magnetic permeability.

According to the invention a lubricant with high relative magnetic permeability is used; which can be achieved, e.g., by adding magnetic particles to the lubricant. As a result, the lubricant acquires much greater magnetic permeability than air so that any magnetic field will concentrate in the lubricant.

The shaft 1 contains an electromagnetic sensor 4 which is executed with an annular core 5 with a generally U-shaped cross-section, which core is formed of iron, for example. A coil 6 is wound around the body of core 5. The outwardly directed extensions of core 5 form the polar pieces 7, 8, whose free ends are located in the casing surface 9 of the shaft 1 at the site of the lubricant film 3. The gap between the polar pieces 7, 8 is bridged by the lubricant film 3.

When an alternating current is supplied to the coil 6, a magnetic field is generated whose field lines are indicated by dotted lines 10. The impedance of coil 6 depends on the thickness of the lubricant film 3. Tests have shown that by means of a similar sensor 4 the thickness of a lubricant film can be measured in the 0.1–20 micron area with a high degree of accuracy.

The coil may be incorporated, for example, in a bridge circuit whereby an alternating current source is connected to the one diagonal while an output signal may be captured at the other diagonal, which output signal is linearly dependent on the thickness of the lubricant film 3.

The electromagnetic sensor may also be executed in a different manner, e.g., a pot-shaped element with a central core, whereby a coil is wound on the central core and this central core, together with the cylindrical outside wall of the pot-shaped element, defines an annular gap which is bridged by the lubricant film to be measured.

Consequently, the invention is not limited to the embodiment described above; the latter can be varied in different ways within the framework of the invention.

We claim:

1. A device for measuring the thickness of a lubricant film between two relatively moving surfaces, said lubricant film having magnetic permeability, said device mounted in one surface on one side of said lubricant film, said device comprising a magnetic core, an electrically energized coil wound about said core and producing magnetic flux in said core, said core having pole pieces bridged along one side by said lubricant film, the impedance of said coil changing as a function of the thickness of said lubricant film, said lubricant film having a much higher magnetic permeability than air, said one of said two surfaces is the casing surface of a shaft, said core has a generally U-shaped cross-section, and said core is contained within said shaft.

2. The device according to claim 1 wherein the distance between said casing surface of said shaft and said other one of said two surfaces at the site of the lubricant film to be measured is in the sub-micron range.

3. The device according to claim 2, wherein said sub-micron range is approximately between 0.1–20 microns.

4. A method for measuring the thickness of a lubricant film between two surfaces which are in motion with respect to each other by an electromagnetic sensor means mounted in one of said two surfaces at the site of the lubricant, said sensor means comprising a magnetic core, an electrically energized coil wound on said core, said core having pole pieces ending in the plane of said one of said two surfaces whereby said pole pieces are bridged by said lubricant film, said one of said two surfaces is the casing surface of a shaft, said core has a generally U-shaped cross-section, and said core is contained within said shaft, said method comprising: forming said lubricant film with a material having a magnetic permeability much higher than air, generating through said coil a magnetic flux in said core between said pole pieces by means of said lubricant film, and then detecting the impedance of said coil between said pole pieces which will vary as a function of the thickness of said lubricant film.

5. The method of claim 4 wherein said lubricant film is provided with magnetic particles.

6. The method of claim 4 wherein the thickness of said lubricant film between said two surfaces is in the sub-micron range.

* * * * *